(12) United States Patent
Park et al.

(10) Patent No.: US 9,059,446 B2
(45) Date of Patent: Jun. 16, 2015

(54) BATTERY MODULE

(75) Inventors: Shi-Dong Park, Yongin-si (KR);
Tae-Yong Kim, Yongin-si (KR);
In-Hwan Cha, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 166 days.

(21) Appl. No.: 13/049,129

(22) Filed: Mar. 16, 2011

(65) Prior Publication Data

US 2012/0115003 A1 May 10, 2012

(30) Foreign Application Priority Data

Nov. 5, 2010 (KR) .................. 10-2010-0109807

(51) Int. Cl.
*H01M 10/50* (2006.01)
*H01M 2/10* (2006.01)
*H01M 10/613* (2014.01)
*H01M 10/647* (2014.01)
*H01M 10/6551* (2014.01)
*H01M 10/6554* (2014.01)

(52) U.S. Cl.
CPC .......... *H01M 2/105* (2013.01); *H01M 10/5004* (2013.01); *H01M 10/5032* (2013.01); *H01M 10/5046* (2013.01); *H01M 10/5053* (2013.01)

(58) Field of Classification Search
CPC ............ H01M 10/50; H01M 10/5046; H01M 10/5053
USPC ........................................................ 429/120
See application file for complete search history.

(56) References Cited

U.S. PATENT DOCUMENTS

| 5,492,779 | A   | * | 2/1996  | Ronning ................... 429/120 |
|-----------|-----|---|---------|------------------------------------|
| 6,183,903 | B1  | * | 2/2001  | Campbell et al. ............ 429/176 |
| 6,403,252 | B1  | * | 6/2002  | Chiang et al. .................. 429/96 |
| 6,572,999 | B1  | * | 6/2003  | Stocchiero ................... 429/176 |
| 7,833,658 | B2  | * | 11/2010 | Cummins et al. ............. 429/176 |
| 2005/0079408 | A1 |   | 4/2005  | Hirano |
| 2008/0134895 | A1 | * | 6/2008  | Ruud et al. ......................... 96/9 |
| 2008/0236190 | A1 | * | 10/2008 | Tsuchiya et al. ............... 62/468 |
| 2008/0292949 | A1 | * | 11/2008 | Shen et al. .................... 429/120 |
| 2010/0266878 | A1 | * | 10/2010 | Eilertsen ........................ 429/53 |

FOREIGN PATENT DOCUMENTS

| JP | 2003-162993 A | 6/2003 |
| JP | 2008-153181   | 7/2008 |
| JP | 2009-099445 A | 5/2009 |
| JP | 2010-067515   | 3/2010 |

(Continued)

OTHER PUBLICATIONS

English Machine Translation of JP 2009-099445, 11 pgs.

(Continued)

*Primary Examiner* — Ula C Ruddock
*Assistant Examiner* — Lisa S Park Gehrke
(74) *Attorney, Agent, or Firm* — Christie, Parker & Hale, LLP

(57) ABSTRACT

A battery module includes a plurality of rechargeable batteries; a housing containing the rechargeable batteries; first heat dissipation ribs protruded from the housing and having a shape of a polygon or a closed curve; and second heat dissipation ribs protruded from the housing and linearly formed to couple the first heat dissipation ribs to each other.

15 Claims, 6 Drawing Sheets

(56) References Cited

FOREIGN PATENT DOCUMENTS

| | | |
|---|---|---|
| KR | 10-2006-0102852 | 9/2006 |
| KR | 10-2007-0094064 | 9/2007 |
| KR | 10-2009-0000302 A | 1/2009 |
| KR | 10-2010-0041442 A | 4/2010 |

OTHER PUBLICATIONS

Korean Office action dated Apr. 27, 2012 issued in Korean Priority Patent Application No. 10-2010-0109807, 3 pages.

Notice of Allowance issued Oct. 30, 2012 for Priority Patent Application No. 10-2010-0109807.

* cited by examiner

BATTERY MODULE

CROSS-REFERENCE TO RELATED APPLICATION

This application claims priority to and the benefit of Korean Patent Application No. 10-2010-0109807 filed in the Korean Intellectual Property Office on Nov. 5, 2010, the entire content of which is incorporated herein by reference.

BACKGROUND

1. Field

The described technology relates generally to a battery module.

2. Description of Related Art

A rechargeable battery differs from a primary battery in that it can be repeatedly charged and discharged, while the latter performs only the irreversible conversion of chemical energy to electrical energy. A low-capacity rechargeable battery may be used as a power supply for small electronic devices, such as cellular phones, notebook computers and camcorders, while a high-capacity rechargeable battery may be used as a power supply for driving motors in hybrid vehicles and the like.

Recently, a high power rechargeable battery that includes a non-aqueous electrolyte having a high energy density has been developed. A high power rechargeable battery may be constituted by a large capacity rechargeable battery in which a plurality of rechargeable batteries are coupled in series in order to drive devices requiring a large amount of power, for example, motors such as those used in electric vehicles.

In addition, a large capacity rechargeable battery generally includes a plurality of rechargeable batteries that are coupled in series, and the rechargeable battery, for example, may be formed of cylindrical and angular shapes.

A large amount of heat may be generated from the rechargeable battery while the battery iteratively performs charging and discharging, and the rechargeable battery may explode or ignite unless the heat is promptly emitted to the outside of the battery.

Further, when the battery module is applied to a vehicle or an electric scooter, a housing may be damaged by external impact due to an accident, such that a short-circuit or electric shock may result (or occur).

The above information disclosed in this Background section is only for enhancement of understanding of the background of the described technology and therefore it may contain information that does not form the prior art that is already known in this country to a person of ordinary skill in the art.

SUMMARY

Aspects of embodiments of the present invention provide a battery module having an improved heat-dissipating structure.

A battery module according to an exemplary embodiment includes: a plurality of rechargeable batteries; a housing containing the rechargeable batteries; first heat dissipation ribs protruded from the housing and having a shape of a polygon or a closed curve; and second heat dissipation ribs protruded from the housing and linearly formed to couple the first heat dissipation ribs to each other.

The first heat dissipation ribs and the second heat dissipation ribs may be at a bottom of the housing.

The first heat dissipation ribs and the second heat dissipation ribs may be at a sidewall of the housing.

The first heat dissipation ribs and the second heat dissipation ribs may be at a sidewall and a bottom of the housing.

The first heat dissipation ribs at the sidewall of the housing may be larger than the first heat dissipation ribs at the bottom of the housing.

A distance between the first heat dissipation ribs at the sidewall of the housing may be greater than a distance between the first heat dissipation ribs at the bottom of the housing.

A density of the first heat dissipation ribs at the bottom of the housing may be higher than that of the first heat dissipation ribs at the sidewall of the housing.

At least one of the first heat dissipation ribs may have a cross-section in a shape selected from the group consisting of a circle, an oval, a quadrangle, and a hexagon.

A heat conductive member having a higher heat conductivity than the housing may be between the rechargeable batteries and the bottom of the housing.

The heat conductive member may include a heat conductive adhesive or a heat conductive tape.

According to another embodiment of the present invention, a battery housing includes: a case for containing a plurality of batteries; first heat dissipation ribs protruded from the case and having a shape of a polygon or a closed curve; and second heat dissipation ribs protruded from the case and linearly formed to couple the first heat dissipation ribs to each other.

The first heat dissipation ribs and the second heat dissipation ribs may be at a bottom of the case.

The first heat dissipation ribs and the second heat dissipation ribs may be at a sidewall of the case.

The first heat dissipation ribs and the second heat dissipation ribs may be at a sidewall and a bottom of the case.

The first heat dissipation ribs at the sidewall of the case may be larger than the first heat dissipation ribs at the bottom of the case.

A distance between the first heat dissipation ribs at the sidewall of the case may be greater than a distance between the first heat dissipation ribs at the bottom of the case.

A density of the first heat dissipation ribs at the bottom of the case may be higher than that of the first heat dissipation ribs at the sidewall of the case.

At least one of the first heat dissipation ribs may have a cross-section in a shape selected from the group consisting of a circle, an oval, a quadrangle, and a hexagon.

A heat conductive member having a higher heat conductivity than the case may be between the rechargeable batteries and the bottom of the case.

The heat conductive member may include a heat conductive adhesive or a heat conductive tape.

DETAILED DESCRIPTION

Figure 1:
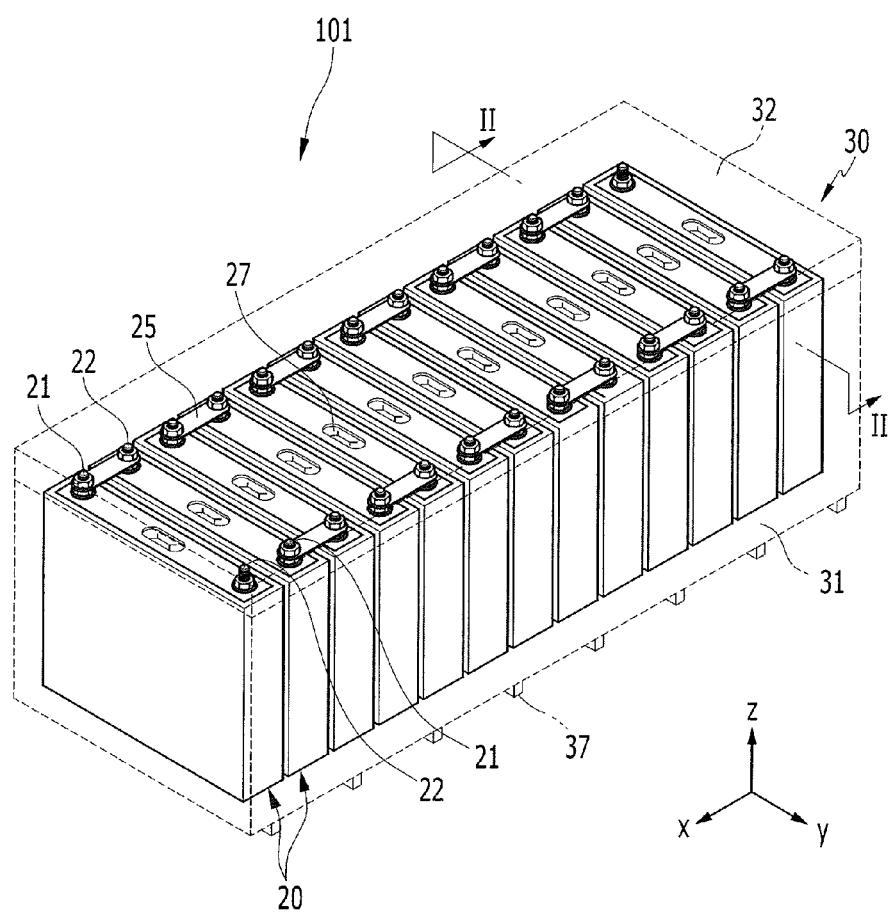
FIG. 1 is a perspective view of a battery module according to a first exemplary embodiment of the present invention.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals designate like elements throughout the specification.

Figure 2:
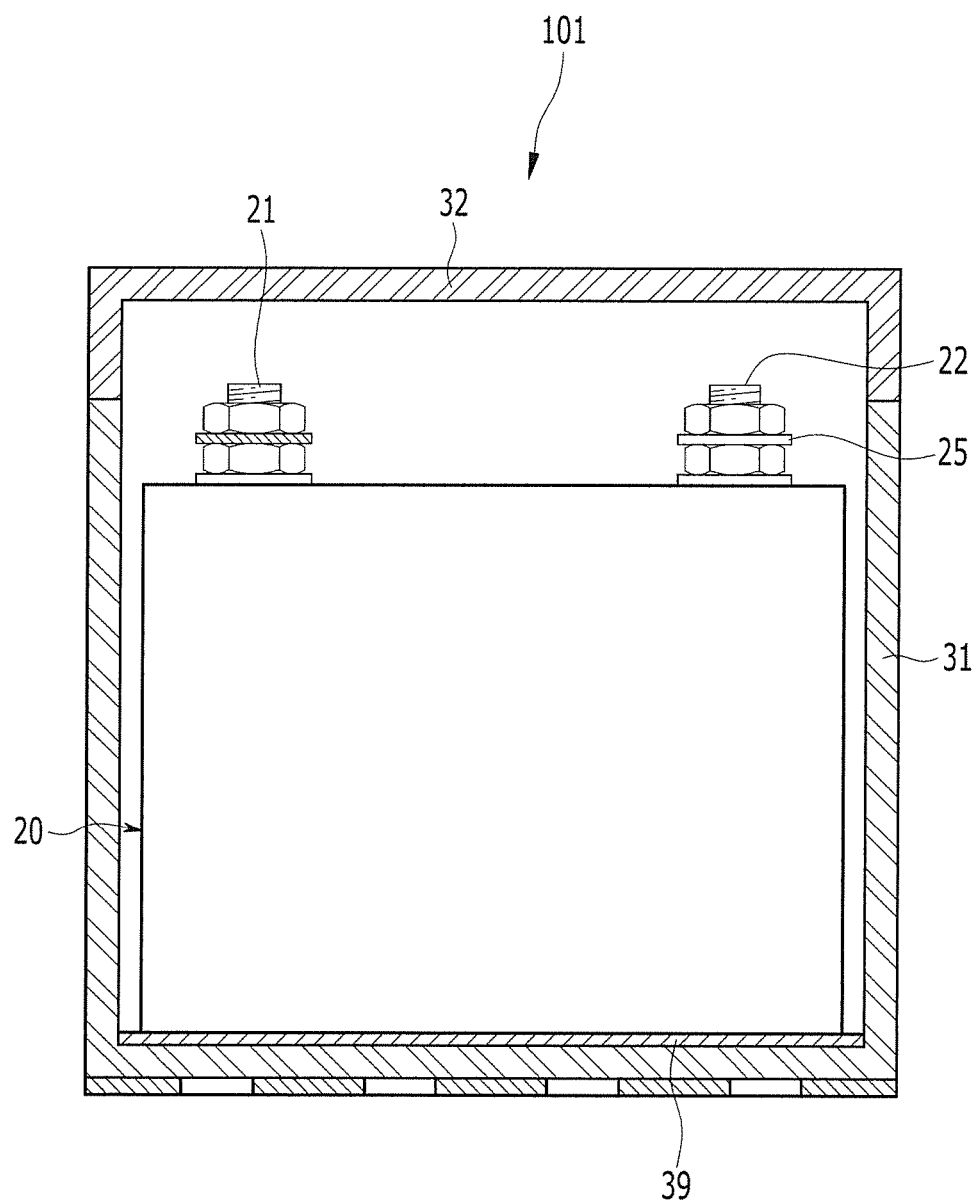
FIG. 2 is a cross-sectional view of FIG. 1, taken along the line II-II.

FIG. 1 is a perspective view of a battery module according to a first exemplary embodiment of the present invention and FIG. 2 is a cross-sectional view of FIG. 1, taken along the line II-II.

Referring to FIG. 1 and FIG. 2, a battery module 101 according to the first exemplary embodiment includes a plurality of rechargeable batteries 20 and a housing 30 in which the rechargeable batteries 20 are installed.

The plurality of rechargeable batteries 20 installed in the housing 30 are exemplarily described as quadrangle-type lithium ion rechargeable batteries. However, without being limited thereto, the present invention may be applicable to various types of batteries such as lithium polymer batteries, cylindrical batteries, and the like.

The rechargeable battery 20 includes a positive terminal 21, a negative terminal 22, and an exhausting member 27 that opens at a pressure (e.g., a predetermined pressure) to emit gas. The exhausting member 27 may be opened when the internal pressure of the rechargeable battery 20 is increased to an opening level (e.g., a predetermined level) and the exhausting member 27 provides a path for emitting internal gas of the rechargeable battery 20 to the outside of the battery.

The plurality of rechargeable batteries 20 in the housing 30 are coupled in series by a plurality of bus bars 25.

The housing 30 includes a body 31 formed in the shape of a rectangular parallelepiped and having an inner space and a cover 32 coupled to (or combined with) an opening of the body 31. The housing 30 has a closed and sealed structure, and the rechargeable batteries 20 are cooled through cooling of the housing 30.

Figure 3:
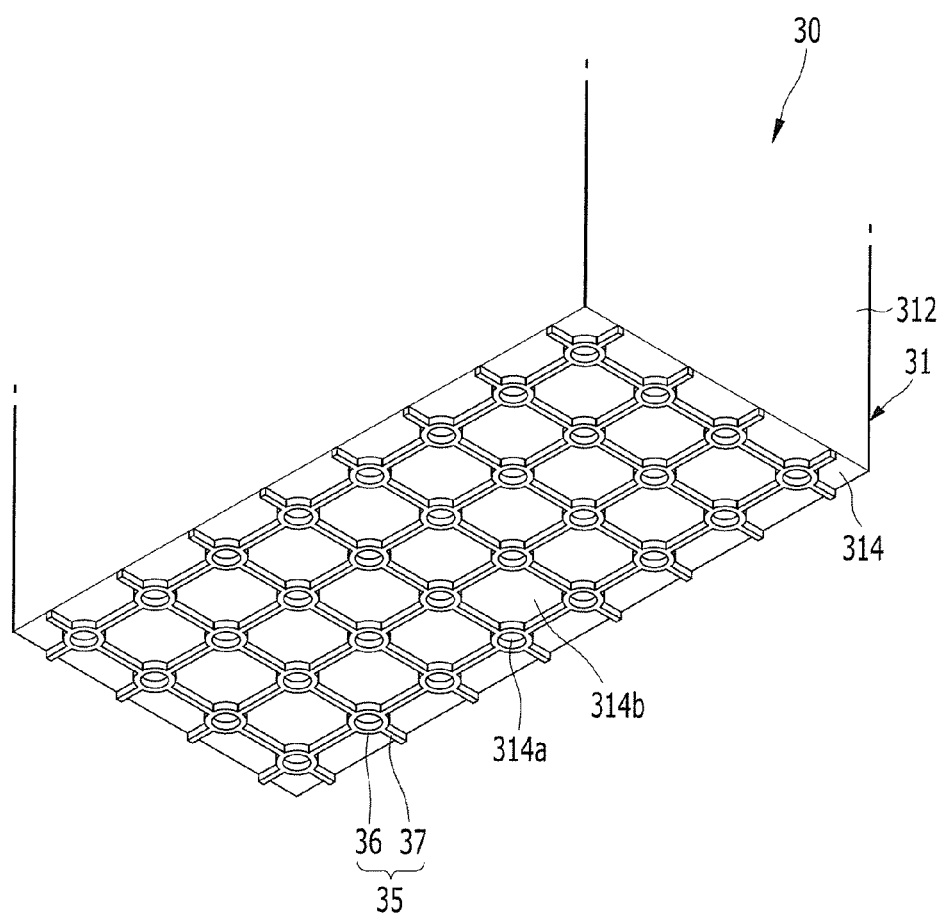
FIG. 3 is a perspective view of the battery module according to the first exemplary embodiment of the present invention, viewed from the bottom thereof.

FIG. 3 is a perspective view of the battery module according to the first exemplary embodiment of the present invention, viewed from the bottom thereof.

Referring to FIG. 2 and FIG. 3, the housing 30 has a bottom (e.g., a bottom plate) 314 and sidewalls 312 protruding from the bottom 314, and the bottom 314 is formed in the shape of a rectangular plate and the sidewalls 312 protrude (or extend) upward at side ends (e.g., side edges of a periphery) of the bottom 314. A thermal conductive member 39 is provided between the rechargeable batteries 20 and the bottom 314. The thermal conductive member 39 may have a thermal conductivity that is higher than that of the housing 30, and may include (e.g., be formed with) a thermal conductive adhesive or a thermal conductive tape. Accordingly, heat generated from the rechargeable battery 20 can be promptly transmitted to the bottom 314 by the thermal conductive member 39.

A protruded heat dissipation rib (or heat dissipation rib structure) 35 is formed at the bottom 314 of the housing 30, and the heat dissipation rib 35 includes first heat dissipation ribs 36 each formed in a closed curve (e.g., a circular shape) and second heat dissipation ribs 37 coupled to the first heat dissipation ribs 36. For example, in one embodiment, each of the first heat dissipation ribs 36 is formed in the shape of a protruded rib having a circular cross-section, and the first heat dissipation ribs 36 are separated from each other with a distance (e.g., a predetermined distance) therebetween.

The second heat dissipation ribs 37 couple the first heat dissipation ribs 36 to each other and each of the second heat dissipation ribs 37 may be linearly formed between adjacent (or respective) first heat dissipation ribs 36. Each of the second heat dissipation ribs 37 is formed in the shape of a straight line, and four of the second heat dissipation ribs 37 are coupled to one of the first heat dissipation ribs 36.

A first end of one of the second heat dissipation ribs 37 contacts one of the first heat dissipation ribs 36, and a second end contacts another one of the first heat dissipation ribs 36 that neighbors the first one of the heat dissipation ribs 36 contacting the first end. As shown in FIG. 3, in one embodiment the second heat dissipation ribs 37 define a rectangular shape and the first heat dissipation ribs 36 are at corners or vertices of the rectangular shape.

According to the first exemplary embodiment, the rechargeable batteries 20 can be efficiently cooled through the housing 30 when the first and second heat dissipation ribs 36 and 37 are formed at the bottom 314. For example, heat generated from the rechargeable batteries 20 is transmitted to the bottom 314 by the thermal conductive member 39, and therefore the rechargeable batteries 20 can be further promptly cooled. The heat dissipation rib 35 may be formed of a metal, and may be integrally formed with the housing 30.

Heat transmitted to a first cooling region 314a formed at an inner side of each of the first heat dissipation ribs 36 may be transferred to the first heat dissipation ribs 36 and then emitted to the outside therethrough. In addition, heat transmitted to a second cooling region 314b surrounded by the first and second heat dissipation ribs 36 and 37 is emitted to the outside through the first and second heat dissipation ribs 36 and 37. Further, since the first heat dissipation ribs 36 are coupled with each other by the second heat dissipation ribs 37, high temperature heat transferred to the first heat dissipation ribs 36 may be dispersed in four directions through the second heat dissipation ribs 37 such that the rechargeable batteries 20 can be cooled to a uniform temperature.

In addition, the heat dissipation rib 35 may improve the strength of the housing 30 while reducing the weight of the housing 30. Since the second heat dissipation ribs 37 are coupled with each other in a length direction and a width direction of the housing 30, the second heat dissipation ribs 37 support pressure transferred to the housing 30. The first heat dissipation ribs 36 coupled to the second heat dissipation ribs 37 support the pressure by decentralizing the pressure. For example, if the ribs are only linearly formed, impact on one rib may cause damage to the other (or entire) ribs, thereby causing damage to the housing. For example, when the battery module 101 is applied to an electric vehicle or an electric scooter, external impact due to a traffic accident and the like may cause damage to the housing 30. When the housing 30 is damaged, a short-circuit may occur so that a fire or electric shock may result (or occur). However, according to the first exemplary embodiment, the first heat dissipation ribs 36 decentralize and absorb (or support) the force transmitted to one of the second heat dissipation ribs 37. The force transmitted to the first heat dissipation ribs 36 may be dispersed to the second heat dissipation ribs 37 extended along directions crossing the sidewalls of the housing 30, such that the impact can be buffered and the strength of the housing 30 can be improved.

Figure 4:
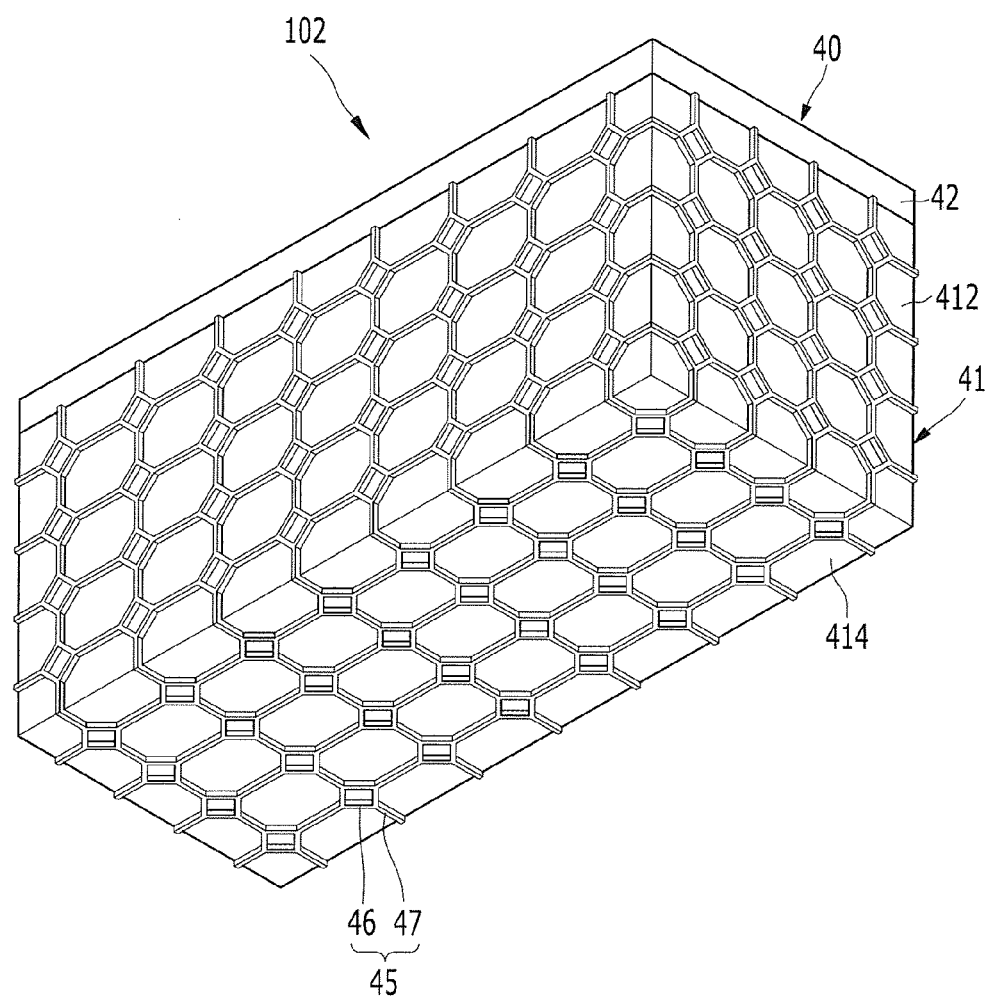
FIG. 4 is a perspective view of a battery module according to a second exemplary embodiment of the present invention.

FIG. 4 is a perspective view of a battery module according to a second exemplary embodiment of the present invention.

Referring to FIG. 4, a battery module 102 according to the second exemplary embodiment includes a plurality of rechargeable batteries and a housing 40 in which the rechargeable batteries are installed.

Since the battery module 102 of the second exemplary embodiment is substantially similar to or substantially the same as that of the first exemplary embodiment, other than a structure of the housing 40, a description of the same or similar structure will not be provided.

The housing 40 includes a body 41 formed in the shape of a rectangular parallelepiped and having an inner space and a cover 42 coupled to (or combined with) an opening of the body 41. The housing 40 has a closed and sealed structure, and the rechargeable batteries are cooled through cooling of the housing 40.

The housing 40 has a bottom (e.g., a bottom plate) 414 and sidewalls 412 protruding from the bottom 414, and the bottom 414 is formed in the shape of a rectangular plate and the sidewalls 412 protrude (or extend) upward at side ends (e.g., side edges or a periphery) of the bottom 414. A protruded heat dissipation rib (or heat dissipation rib structure) 45 is formed at the bottom 414 and at the sidewalls 412, and includes first heat dissipation ribs 46 each formed in the shape of a polygon and second heat dissipation ribs 47 coupled to the first heat dissipation ribs 46. Each of the first heat dissipation ribs 46 has a quadrangular-shaped cross-section, and the first heat dissipation ribs 46 are separated from each other with a distance (e.g., a predetermined distance) therebetween.

The second heat dissipation ribs 47 couple the first heat dissipation ribs 46 to each other and each of the second heat dissipation ribs 47 may be linearly formed between adjacent (or respective) first heat dissipation ribs 46. Each of the second heat dissipation ribs 47 may be formed in the shape of a straight line, and four of the second heat dissipation ribs 47 may be coupled to one of the first heat dissipation ribs 46. The second heat dissipation ribs 47 may be coupled with the first heat dissipation ribs 46 at corners or vertices of the first heat dissipation ribs 46.

A first end of one of the second heat dissipation ribs 47 contacts one of the first heat dissipation ribs 46, and a second end contacts another one of the first heat dissipation ribs 46 that neighbors the first one of the heat dissipation ribs 46 contacting the first end. As shown in FIG. 4, in one embodiment the second heat dissipation ribs 47 define an octagonal shape and the first heat dissipation ribs 46 are at corners or vertices of the octagonal shape.

According to the second exemplary embodiment, the rechargeable batteries 20 can be efficiently cooled through the housing 40 when the first and second heat dissipation ribs 46 and 47 are formed at the bottom 414 and at the sidewalls 412. Further, since the first heat dissipation ribs 46 are coupled with each other via the second heat dissipation ribs 47, high temperature heat transferred to the first heat dissipation ribs 46 may be dispersed in four directions through the second heat dissipation ribs 47 such that the rechargeable batteries 20 can be cooled to a uniform temperature.

In addition, the heat dissipation rib 45 may improve the strength of the housing 40 while reducing the weight of the housing 40. Since the second heat dissipation ribs 47 are coupled with each other in a length direction and a width direction of the housing 40, the second heat dissipation ribs 47 support pressure transferred to the housing 40. The first heat dissipation ribs 46 coupled to the second heat dissipation ribs 47 support the pressure by decentralizing the pressure. For example, if the ribs are only linearly formed, impact on one rib may cause damage to the other (or entire) ribs, thereby causing damage to the housing. For example, when the battery module 102 is applied to an electric vehicle or an electric scooter, external impact due to a traffic accident and the like may cause damage to the housing 40. When the housing 40 is damaged, a short-circuit may occur so that a fire or electric shock may result (or occur). However, according to the second exemplary embodiment, the first heat dissipation ribs 46 decentralize and absorb (or support) the force transmitted to one of the second heat dissipation ribs 47. The force transmitted to the first heat dissipation ribs 46 may be dispersed to the second heat dissipation ribs 47 extended along directions crossing the sidewalls of the housing 40 such that the impact can be buffered and the strength of the housing 40 can be improved.

Figure 5:
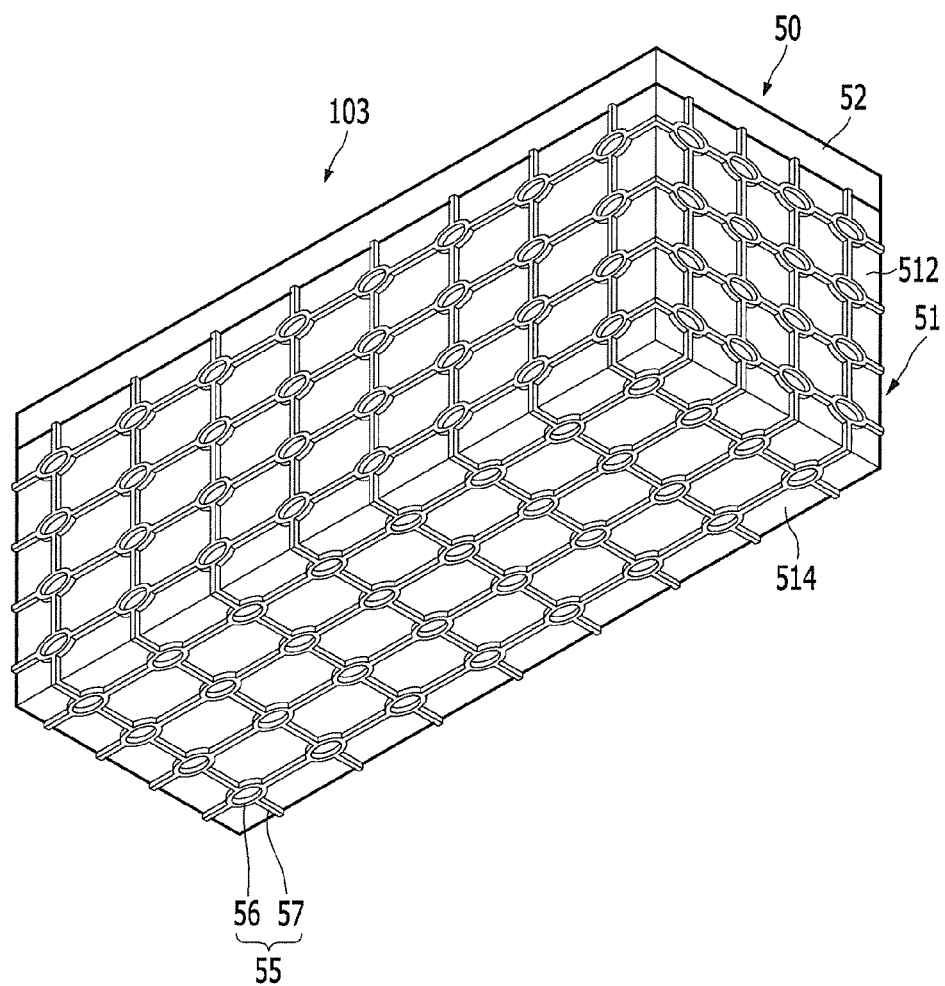
FIG. 5 is a perspective view of a battery module according to a third exemplary embodiment of the present invention.

FIG. 5 is a perspective view of a rechargeable battery according to a third exemplary embodiment of the present invention.

Referring to FIG. 5, a battery module 103 according to the third exemplary embodiment includes a plurality of rechargeable batteries and a housing 50 in which the plurality of rechargeable batteries is installed.

Since the battery module 103 of the third exemplary embodiment is substantially similar to or substantially the same as that of the first exemplary embodiment, other than a structure of the housing 50, a description of the same or similar structure will not be provided.

The housing 50 includes a body 51 formed in the shape of a rectangular parallelepiped and having an inner space and a cover 52 coupled to (or combined with) an opening of the body 51. The housing 50 has a closed and sealed structure, and the rechargeable batteries are cooled through cooling of the housing 50.

The housing 50 has a bottom (e.g., a bottom plate) 514 and sidewalls 512 protruding from the bottom 514, and the bottom 514 is formed in the shape of a rectangular plate and the sidewalls 512 protrude (or extend) upward at side ends (e.g., side edges of a periphery) of the bottom 514. A protruded heat dissipation rib (or heat dissipation rib structure) 55 is formed at the bottom 514 and at the sidewalls 512, and includes first heat dissipation ribs 56 each formed in the shape of a oval and second heat dissipation ribs 57 coupled to the first heat dissipation ribs 56. Each of the first heat dissipation ribs 56 has an oval-shaped cross-section, and the first heat dissipation ribs 56 are separated from each other with a distance (e.g., a predetermined distance) therebetween.

The second heat dissipation ribs 57 couple the first heat dissipation ribs 56 to each other and each of the second heat dissipation ribs 57 may be linearly formed between adjacent (or respective) first heat dissipation ribs 56. Each of the second heat dissipation ribs 57 may be formed in the shape of a straight line, and four of the second heat dissipation ribs 57 may be coupled to one of the first heat dissipation ribs 56.

A first end of one of the second heat dissipation ribs 57 contacts one of the first heat dissipation ribs 56, and a second end contacts another one of the first heat dissipation ribs 56 that neighbors the first one of the heat dissipation ribs 56 contacting the first end. As shown in FIG. 5, in one embodiment the second heat dissipation ribs 57 define a rectangular shape and the first heat dissipation ribs 56 are at corners or vertices of the rectangular shape.

According to the third exemplary embodiment, the rechargeable batteries can be efficiently cooled through the housing 50 when the first and second heat dissipation ribs 56 and 57 are formed at the bottom 514 and at the sidewalls 512. Further, since the first heat dissipation ribs 56 are coupled with each other via the second heat dissipation ribs 57, high temperature heat transferred to the first heat dissipation ribs 56 may be dispersed in four directions through the second heat dissipation ribs 57 such that the rechargeable batteries can be cooled to a uniform temperature.

In addition, the heat dissipation rib 55 may improve the strength of the housing 50 while reducing the weight of the housing 50. Since the second heat dissipation ribs 57 are coupled with each other in a length direction and a width direction of the housing 50, the second heat dissipation ribs 57 support pressure transferred to the housing 50. The first heat dissipation ribs 56 coupled to the second heat dissipation ribs 57 support the pressure by decentralizing the pressure. For example, if the ribs are only linearly formed, impact on one rib may cause damage to the other (or entire) ribs, thereby causing damage to the housing. For example, when the battery module 103 is applied to an electric vehicle or an electric scooter, external impact due to a traffic accident and the like may cause damage to the housing 50. When the housing 50 is damaged, a short-circuit may occur so that a fire or electric shock may result (or occur). However, according to the third exemplary embodiment, the first heat dissipation ribs 56 decentralize and absorb (or support) the force transmitted to one of the second heat dissipation ribs 57. The force transmitted to the first heat dissipation ribs 56 may be dispersed to the second heat dissipation ribs 57 extended along directions crossing the sidewalls of the housing 50 such that the impact can be buffered and the strength of the housing 50 can be improved.

Figure 6:
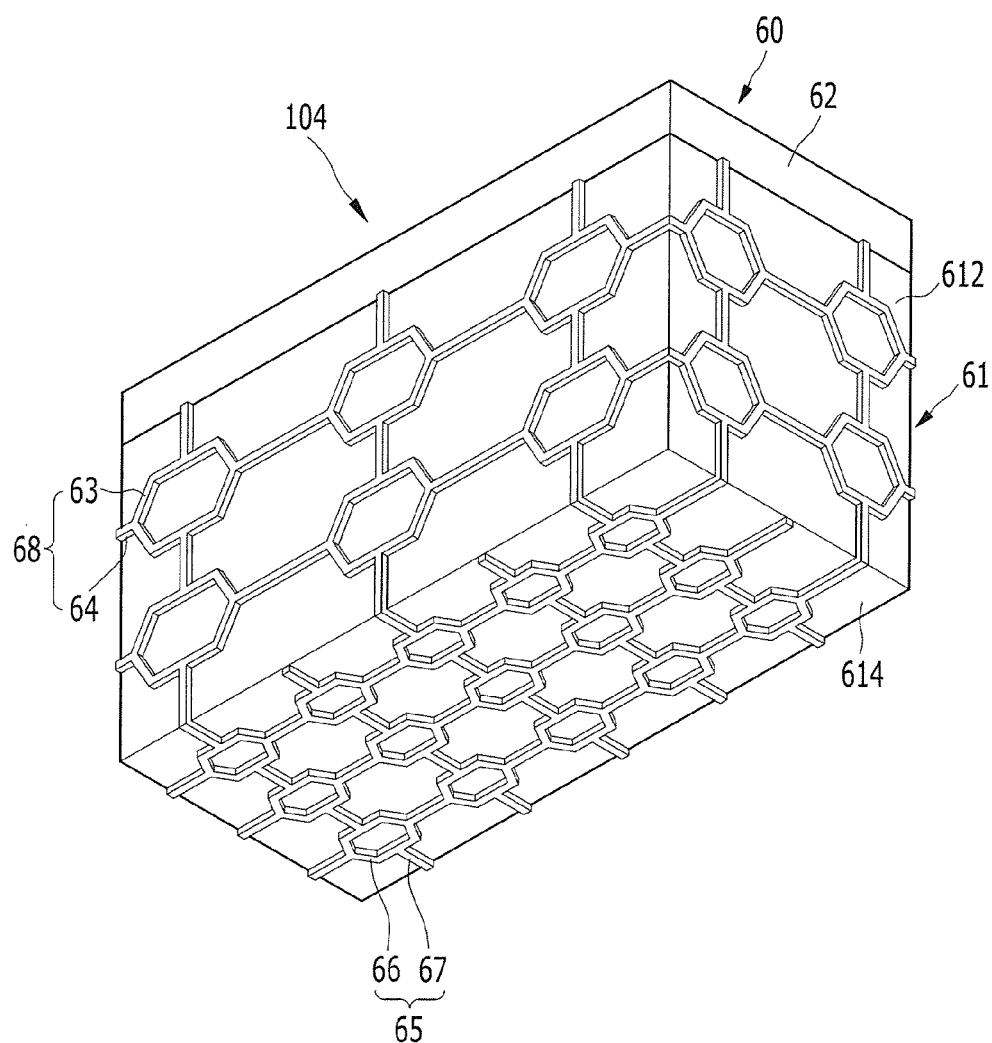
FIG. 6 is a perspective view of a battery module according to a fourth exemplary embodiment of the present invention.

FIG. 6 is a perspective view of a battery module according to a fourth exemplary embodiment of the present invention.

Referring to FIG. 6, a battery module 104 according to the fourth exemplary embodiment includes a plurality of rechargeable batteries and a housing 60 in which the plurality of rechargeable batteries is installed.

Since the battery module 104 of the fourth exemplary embodiment is substantially similar to or substantially the same as that of the first exemplary embodiment, other than the structure of the housing 60, a description of the same or similar structure will not be provided.

The housing 60 includes a body 61 formed in the shape of a rectangular parallelepiped and having an inner space and a cover 62 coupled to (or combined with) an opening of the body 61. The housing 60 has a closed and sealed structure, and the rechargeable batteries are cooled through cooling of the housing 60.

The housing 60 has a bottom (e.g., a bottom plate) 614 and sidewalls 612 protruding from the bottom 614, and the bottom 614 is formed in the shape of a rectangular plate and the sidewalls 612 protrude (or extend) upward at side ends (e.g., side edges of a periphery) of the bottom 614.

A sidewall heat dissipation rib (or sidewall heat dissipation rib structure) 68 is formed at the sidewalls 612, and the sidewall heat dissipation rib 68 includes first sidewall heat dissipation ribs 63 each formed in the shape of a hexagon and second sidewall heat dissipation ribs 64 coupled to the first sidewall heat dissipation ribs 63. The first sidewall heat dissipation ribs 63 are each formed in the shape of a protruding rib having a hexagonal cross-section, and the first sidewall heat dissipation ribs 63 are separated from each other with a gap (e.g., a predetermined gap) therebetween.

The second sidewall heat dissipation ribs 64 are formed between adjacent (or respective) first sidewall heat dissipation ribs 63 for connection therebetween. Each of the second sidewall heat dissipation ribs 64 may be formed in the shape of a straight line, and four of the second sidewall heat dissipation ribs 64 may be formed at (e.g., coupled to) each of the first sidewall heat dissipation ribs 63.

A bottom heat dissipation rib (or bottom heat dissipation rib structure) 65 is formed at the bottom 614, and the bottom heat dissipation rib 65 includes first bottom heat dissipation ribs 66 each formed in the shape of a hexagon and second bottom heat dissipation ribs 67 coupled to the first bottom heat dissipation ribs 66. Each of the first bottom heat dissipation ribs 66 is formed in the shape of a protruding rib having a hexagonal cross-section, and the first bottom heat dissipation ribs 66 are separated from each other with a gap (e.g., a predetermined gap) therebetween.

Each of the second bottom heat dissipation ribs 67 is formed between adjacent (or respective) first bottom heat dissipation ribs 66 for connection therebetween. Each of the second bottom heat dissipation ribs 67 may be formed in the shape of a straight line, and four of the second bottom heat dissipation ribs 67 may be formed at each of the first bottom heat dissipation ribs 66. As shown in FIG. 6, in one embodiment the second heat dissipation ribs 67 define a polygonal shape and the first heat dissipation ribs 66 are at corners or vertices of the polygonal shape.

The first sidewall heat dissipation ribs 63 may be greater than the first bottom heat dissipation ribs 66 in size, and the gap between the first sidewall heat dissipation ribs 63 may be greater than the gap between the first bottom heat dissipation ribs 66. Accordingly, the density of the first bottom heat dissipation ribs 66 may be higher (e.g., much higher). Thus, more heat (e.g., much more heat) can be emitted through the bottom 614. The heat generated from the rechargeable batteries most rapidly moves to the bottom 614 of the housing 60, and accordingly, the rechargeable batteries can be stably cooled by promptly cooling the bottom 614 to which a relatively large amount of heat is transmitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

<Description of Some of the Reference Numerals>

| | |
|---|---|
| 101, 102, 103, 104: battery module | 20: rechargeable battery |
| 21: positive terminal | 22: negative terminal |
| 27: exhausting member | 30, 40, 50, 60: housing |
| 31, 41, 51, 61: body | 32, 42, 52, 62: cover |
| 35, 45, 55: heat dissipation rib | |
| 36, 46, 56: first heat dissipation rib | |
| 37, 47, 57: second heat dissipation rib | |
| 39: thermal conductive member | |
| 312, 412, 512, 612: sidewall | 314, 414, 514, 614: bottom |
| 314a: first cooling region | 314b: second cooling region |
| 68: sidewall heat dissipation rib | |
| 63: first sidewall heat dissipation rib | |
| 64: second sidewall heat dissipation rib | 65: bottom heat dissipation rib |
| 66: first bottom heat dissipation rib | |
| 67: second bottom heat dissipation rib | |

What is claimed is:

1. A battery module comprising:
   a plurality of rechargeable batteries;
   a housing containing the rechargeable batteries;
   first heat dissipation ribs protruded from the housing and having a shape of a polygon or a closed curve, wherein each of the first heat dissipation ribs comprises at least one rib enclosing a polygonal or circular shaped area; and
   second heat dissipation ribs protruded from the housing and linearly formed to couple the first heat dissipation ribs to each other, wherein the second heat dissipation ribs define a polygonal shape and at least one of the first heat dissipation ribs has a shape different from the polygonal shape, and wherein the first heat dissipation ribs and the second heat dissipation ribs are at a sidewall and a bottom of the housing, and the second heat dissipation ribs at the sidewall are directly coupled to the second heat dissipation ribs at the bottom.

2. The battery module of claim 1, wherein the first heat dissipation ribs at the sidewall of the housing are larger than the first heat dissipation ribs at the bottom of the housing.

3. The battery module of claim 1, wherein a distance between the first heat dissipation ribs at the sidewall of the housing is greater than a distance between the first heat dissipation ribs at the bottom of the housing.

4. The battery module of claim 1, wherein a density of the first heat dissipation ribs at the bottom of the housing is higher than that of the first heat dissipation ribs at the sidewall of the housing.

5. The battery module of claim 1, wherein the at least one of the first heat dissipation ribs has a cross-section in a shape selected from the group consisting of a circle, an oval, a quadrangle, and a hexagon.

6. The battery module of claim 1, wherein a heat conductive member having a higher heat conductivity than the housing is between the rechargeable batteries and the bottom of the housing.

7. The battery module of claim 6, wherein the heat conductive member comprises a heat conductive adhesive or a heat conductive tape.

8. A battery housing comprising:
a case for containing a plurality of batteries;
first heat dissipation ribs protruded from the case and having a shape of a polygon or a closed curve, wherein each of the first heat dissipation ribs comprises at least one rib enclosing a polygonal or circular shaped area; and
second heat dissipation ribs protruded from the case and linearly formed to couple the first heat dissipation ribs to each other, wherein the second heat dissipation ribs define a polygonal shape and at least one of the first heat dissipation ribs has a shape different from the polygonal shape, and
wherein the first heat dissipation ribs and the second heat dissipation ribs are at a sidewall and a bottom of the case, and the second heat dissipation ribs at the sidewall are directly coupled to the second heat dissipation ribs at the bottom.

9. The battery housing of claim 8, wherein the first heat dissipation ribs at the sidewall of the case are larger than the first heat dissipation ribs at the bottom of the case.

10. The battery housing of claim 8, wherein a distance between the first heat dissipation ribs at the sidewall of the case is greater than a distance between the first heat dissipation ribs at the bottom of the case.

11. The battery housing of claim 8, wherein a density of the first heat dissipation ribs at the bottom of the case is higher than that of the first heat dissipation ribs at the sidewall of the case.

12. The battery housing of claim 8, wherein the at least one of the first heat dissipation ribs has a cross-section in a shape selected from the group consisting of a circle, an oval, a quadrangle, and a hexagon.

13. The battery housing of claim 8, wherein a heat conductive member having a higher heat conductivity than the case is between the batteries and the bottom of the case.

14. The battery housing of claim 13, wherein the heat conductive member comprises a heat conductive adhesive or a heat conductive tape.

15. The battery module of claim 1, wherein four of the second heat dissipation ribs are coupled to a corresponding one of the first heat dissipation ribs.

* * * * *